Nov. 13, 1956  L. J. KMIECIK  2,770,695
BOILER CONTROL MECHANISM
Filed Jan. 21, 1954  2 Sheets-Sheet 1
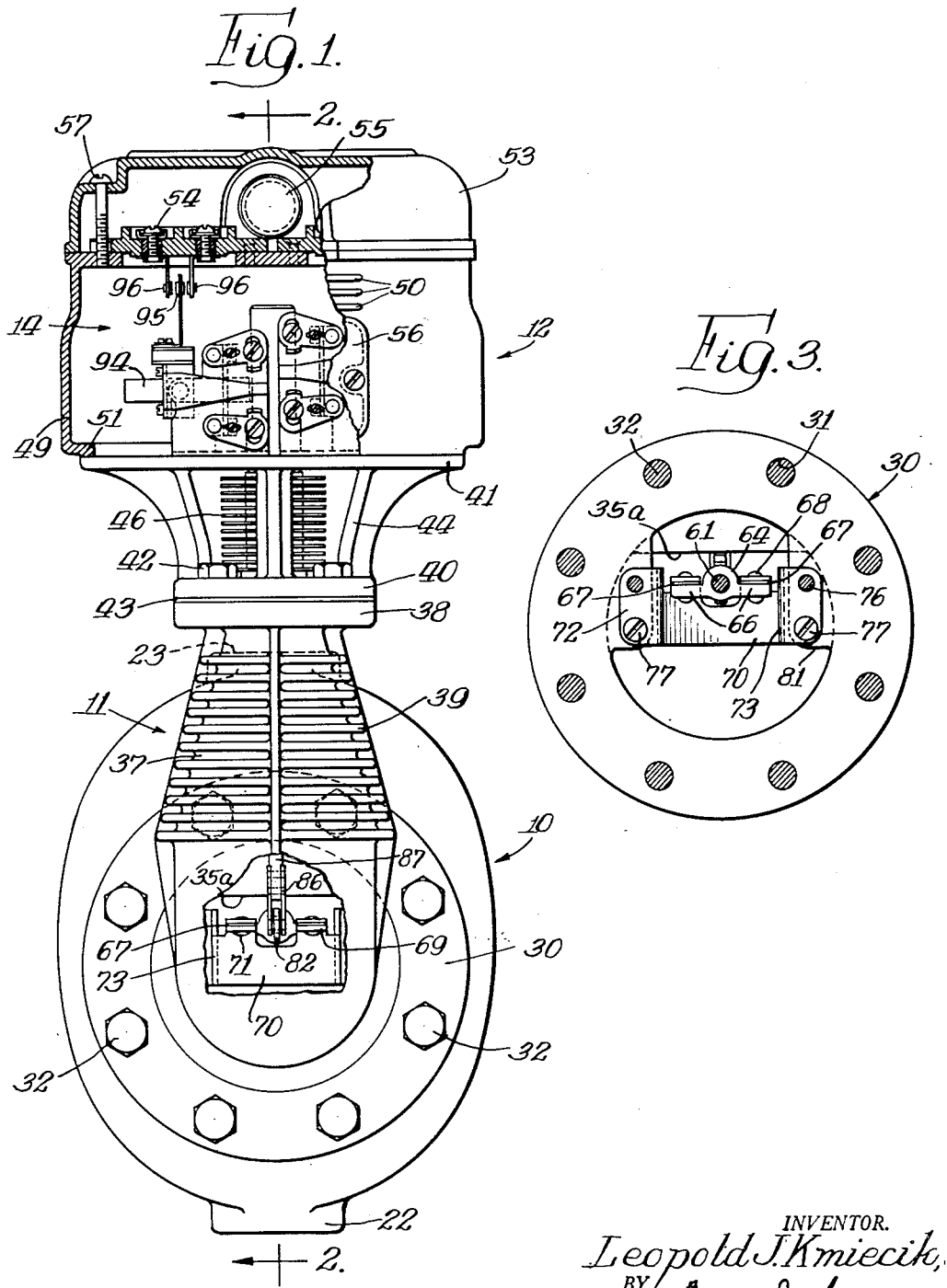
INVENTOR.
Leopold J. Kmiecik, Nov. 13, 1956 L. J. KMIECIK 2,770,695
BOILER CONTROL MECHANISM
Filed Jan. 21, 1954 2 Sheets-Sheet 2
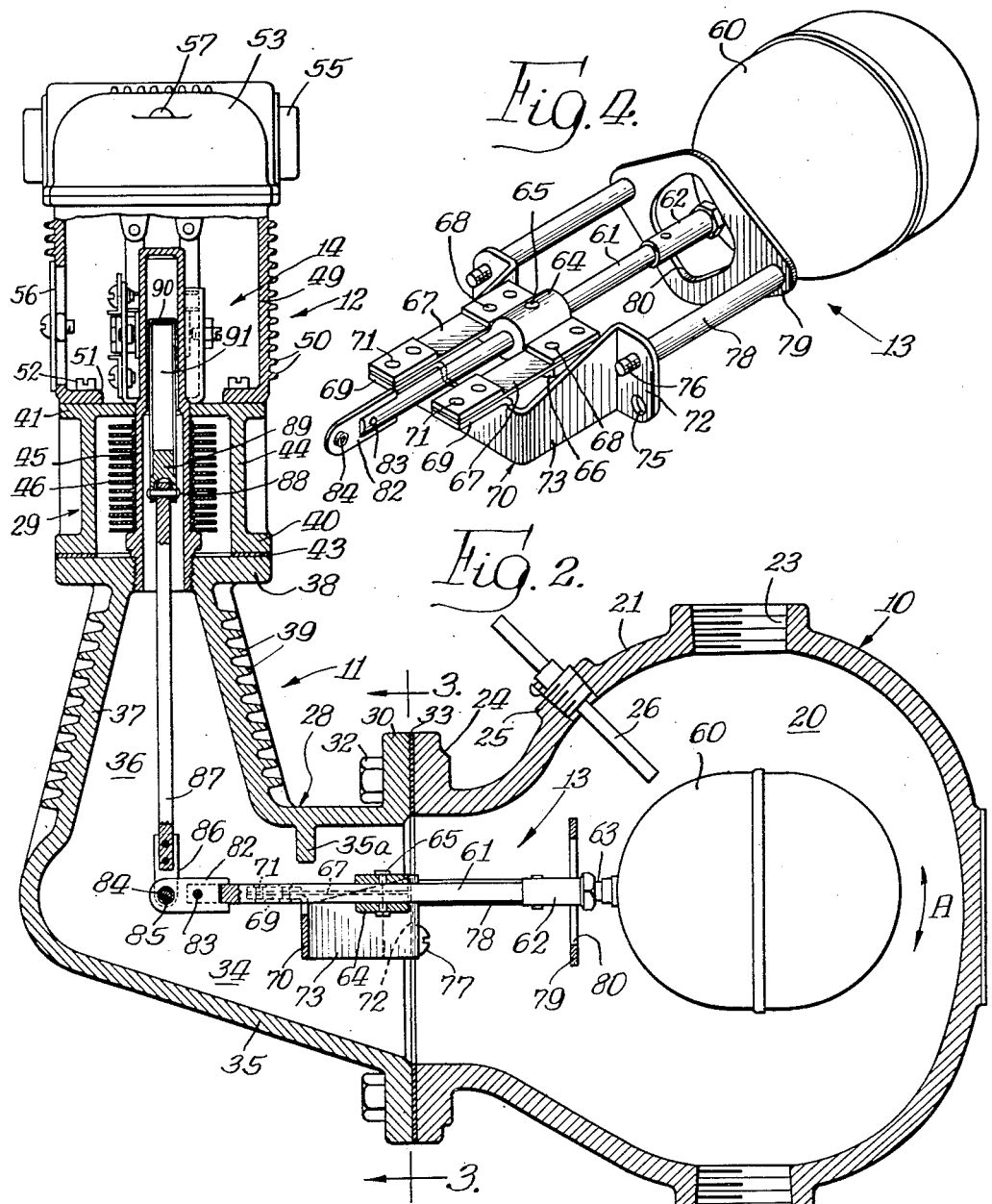
INVENTOR.
Leopold J. Kmiecik,
BY
Attys.

United States Patent Office 2,770,695
Patented Nov. 13, 1956

2,770,695
BOILER CONTROL MECHANISM

Leopold J. Kmiecik, Chicago, Ill., assignor to McDonnell & Miller, Inc., Chicago, Ill., a corporation of Delaware Application January 21, 1954, Serial No. 405,286

7 Claims. (Cl. 200—84)

This invention relates generally to boiler controls and more particularly to improvements in supporting means for float mechanisms in liquid level responsive boiler control devices.

Briefly, the improved features which comprise the heart of my present invention lie in a new and improved float mechanism for use in liquid level responsive control devices for boilers and the like. Additional features are directed to a new and improved housing construction for such a float mechanism which is capable of thermally reducing the operating ambients of a switch device operated by a float mechanism, thereby giving improved operating efficiency and life span to this class of control devices.

The main object of this invention is to provide a new and improved float assembly for liquid level responsive boiler control mechanisms.

A further object of this invention is to provide a new and improved pivotal mounting means for liquid level responsive float control devices, whereby improved stability and operating efficiency for the float assembly is brought about.

A further object of this invention is to provide a new and improved housing arrangement for carrying liquid level responsive float control linkages and means operatively associated with electrical switching apparatus; the housing being such as to produce substantial reductions in operating temperatures of the switch apparatus.

A still further object of this invention is to provide a new and improved boiler control device embodying structural features for insulating an electrical switch mechanism, operated by a liquid level responsive float mechanism.

The above and further objects, features and advantages of this invention will be apparent to those skilled in the art from the following detailed description of a preferred embodiment of its concepts as found in the accompanying drawings.

In the drawings:

Figure 1 is an end elevational view, with parts broken away in cross-section, of an improved boiler control device embodying the concepts and features of this invention;

Figure 2 is a cross-sectional view of the device seen in Figure 1, taken substantially from the vantage line 2, 2 of Figure 1, or that is, generally along the longitudinal center line of the device;

Figure 3 is an end elevational view taken at line 3, 3, of Figure 2 showing the appearance and operational organization of the improved mounting means for my float assembly; and Figure 4 is a perspective showing of my improved float assembly and mounting means therefor.

Turning now to the drawings, particularly Figures 1 and 2, it will be understood that the device therein relates generally to liquid level responsive float controls of the general type normally and familiarly associated with boilers. Particularly, the control device illustrated comprises a three part housing including a float chamber housing 10 which is connected to a linkage housing 11 which supports a switch housing indicated generally at 12. Located partially within the float chamber housing 10 and extending into and through the interior of the linkage housing 11 is a float mechanism indicated generally at 13. Within the switch housing 12 and actuated by the float mechanism 13 is a switch mechanism, indicated generally at 14.

For clarity of understanding the several portions 10 through 14 of my device will now be discussed individually in the order of their above indicated numerical sequence.

The float chamber housing 10, as its name implies, is designed and arranged to enclose a float chamber, indicated generally by numeral 20. This housing includes a substantially spherical outer wall 21 which defines and encompasses chamber 20 and which is provided with a threaded inlet opening 22, located generally adjacent its bottom side and a similar outlet opening 23, located generally opposite inlet 22. Intermediate the inlet and outlet and on one side of housing 10 is a substantially annular flange portion 24 surrounding and defining a generally circular opening in the outer wall 21 of the housing 10. Additionally housing 10 is fitted with an internally threaded boss 25 in the upper side of wall 21 through which a stop rod 26 is mounted. Such rod is normally engaged with the float ball to hold the same at its lowermost limit for purposes of preventing vibration and damage to the float when shipping the control device. When the unit is installed in a boiler for operation, rod 26 is usually removed and boss 25 plugged or otherwise sealed over.

As is the general case in fabricating housings of this character, the same may be cast of any suitable material familiarly employed for this purpose, such as cast iron, for example. It will be understood and recognized that the flange portion 24 is arranged to engage with the linkage housing 11, as will now be described.

Linkage housing 11 is a two part housing comprising lower and upper sections 28 and 29, respectively. The lower section 28 is generally elbow shaped and is provided at one end with a substantially annular flange portion 30, as best illustrated in Figure 3. A plurality of openings 31 are formed in spaced array about flange 30, according to familiar practice, for the passage of tie bolts or stud members 32 whereby connection of flange 30 to flange 24 of the float housing is accomplished. Preferably, in so attaching housing 10 to housing 11, a compressable gasket 33 is inserted between the adjacent faces of the registering flange portions 24 and 30 to form a fluid tight seal therebetween. Formed generally behind flange portion 30 is a first conical chamber portion 34 defined by a first substantially conical outer wall portion 35 provided with a depending skirt or wall 35a which invades chamber 34. Chamber 34 communicates with a substantially similar second chamber 36 which is defined by a second conical wall portion 37 of housing section 28, illustrated best in Figure 2 of the drawings. The second conical wall 37, it will be noted, is cast or formed integrally with wall 35 and related generally at right angles with respect thereto such that the longitudinal axis of chamber 36 lies substantially transversely to the longitudinal axis of chamber 34. The upper end of lower housing section 28 is distinguished by an upper flange portion 38, similar to the previously described flange portions 24 and 30, but of a smaller diameter. It will be noted additionally that exterior walls 37 of the housing portion 28 are characterized by a plurality of outwardly projecting and separated air cooling fins 39. The purpose of such fins 39 is for cooling, naturally, but the relation of this feature to the operation of my device will be referred to in greater detail hereinafter.

Regarding the upper portion 29 of housing 11, it will be noted that the flange member 38 formed at the upper end of chamber walls 37 is designed and arranged for connection to a similar flange 40 at the lower end of housing portion 29. The upper end of housing portion 29 is provided with by an additional, larger and substantially rectangular shaped flange 41. Bolt means 42 are used to interconnect the two flange portions 38 and 40 to join the upper and lower housing portions. Integral with and extending transversely between the two flange portions 40 and 41 are spaced web portions 44, 44. It will be recognized that both the upper and lower flange portions 40 and 41 are provided with a central axial opening aligned with a similar opening in flange portion 38 for the passage and mounting of a hollow dome plug member 45. Dome or blind hole plug 45 is threaded at its lower end for connection with flange 38 and extends upwardly through flanges 40 and 41 into the interior of switch housing 12. The upper end of the dome member is walled over to seal the switch chamber from the linkage and float chambers. Air cooling fins 46, 46 are likewise formed about the exterior of plug 45 to assist in cooling the same. This dome member permits linkage actuated by the float mechanism 13 to actuate the switch mechanism within switch housing 12 as will be described later herein.

The switch housing 12 comprises a substantially rectangular hollow lower casting portion 49 having side walls formed with air cooling fins 50 and the bottom wall of which is flanged inwardly at 51 for attachment to the upper end of flange 41 of the linkage housing assembly 11 as by screw means 52, 52. This lower portion 49 of the switch housing is arranged to house and enclose the switch assembly 14. An upper cover portion 53 is provided to fit registeringly over lower portion 49; such enclosing terminal means 54 of the switch assembly and having inlet means 55 for the passage of supply conductors and the like. An inspection cover plate 56 is provided in one side wall of the housing portion 49 for inspecting the switch assembly 14 and providing easy access for the adjustment of the switch mechanism per se. Attachment of the cover portion 53 to the lower housing portion proper is by means of elongated bolts 57, 57 or like connectors. Generally speaking, the switch housing of this character is conventional in the art and comprises no essential portion of my present invention, other than as a means for providing protection for the switch means actuated by the float assembly and linkage means 13 in response to fluid level changes within chamber 20.

Turning now to the major feature of my present invention, the float assembly 13 is best illustrated in Figures 2 and 4 of the drawings. As will be seen from Figure 2, particularly, the float assembly includes a hollow spherical float member 60 which is attached to the outer end of a pivotally moveable float rod member 61, as by means of a threaded sleeve member 62 arranged for threading engagement with a stem portion 63 protruding from one end of float member 60. Normally, in mechanisms of this type, a simple end pivot is utilized for supporting the float rod 61. However, according to my present invention I propose that the rod member 61 shall be supported by means of resilient springs at a point intermediate its ends, leaving both ends of the rod free for arcuate swinging movement about a central pivot or fulcrum. I believe that this new and improved means for so supporting the float rod 61 constitutes the heart of my invention and marks the same as an advancement in this art.

As for the means for pivotally supporting rod 61, reference should now be had to Figure 4 of the drawings especially, wherein the same is illustrated in perspective for the sake of clarity. From that figure it will be appreciated that intermediate the ends of rod 61 is a collar member 64 through which the rod 61 passes lengthwise. A pin means 65 or the like is employed to fix the collar 64 rigidly to the rod member 61. Collar member 64 is also provided with a pair of coplanar and laterally extending ear portions 66 (best illustrated in Figure 3). To the upper face of each of such ear portions is rigidly attached one end of one of two flexible leaf springs 67, 67 as by rivet means 68 or the like. The spring elements 67 are arranged so that they extend alike from the two ear portions 66 substantially in longitudinal parallelism along opposite sides of the rod 61. The other ends of such springs 67 are attached rigidly to tab portions 69 of a support bracket 70, as by rivet means 71. It will be noted that the springs 67 are rather short in length having both ends thereof attached rigidly as described, and leaving a free flexible portion intermediate their points of attachment with bracket 70 and collar 64. This arrangement provides the required pivot or fulcrum for the float and rod as sought for the operation of a device of this class.

The bracket 70 is generally horseshoe shaped in plan and has mounting ear elements 72, 72 at the ends of parallel spaced leg portions 73, 73. Each ear element 72 is provided with a pair of spaced apertures 75, 75, one for the passage of a long spacing bolt 76 and one for the passage of a mounting bolt 77. With reference to the spacer bolts 76, it will be appreciated from Figure 4 that around each one of such bolts, of which there are two, and extending forwardly of one face of a related ear portion 72 of the mounting bracket, is a spacing collar 78 arranged and adapted to hold in spaced relation relative to the bracket 70 a substantially diamond shape limit collar 79 having a central opening 80 through which the actuating float rod 61 passes. The limit collar 79 is further located intermediate the float member 60 and the bracket 70. The attaching bolts 77, 77 of which there are two, are employed for connecting the bracket 70 to projections 81, 81 formed integrally with the flange portion 30 of the linkage housing 11; such extending inwardly of the open center or passageway in such flange through which the rod 61 extends. The exact mode of attaching and the structural arrangement of the float assembly portions described up to this point, will be recognized by studying Figure 2 of the drawings especially.

With the structure thus far described it will be appreciated that the float assembly, comprising the float 60 and rod 61 is supported for pivotal actuation about a fulcrum intermediate the ends of rod 61 by means of the two spaced leaf springs 67, 67. Such leaf springs give a flexible activity to the float which is both sensitive and yet rigidly stable. As to the stability of my pivot mounting means, it will be noted that the two leaf springs provide particularly good lateral ruggedness and rigidity substantially preventing lateral motion of the float. At the same time, the float rod 61 and the attached float 60 are free to move in a substantially vertical arcuate path. The limit plate 79, by way of its central aperture 80, serves to effectively determine the upper and lower limits of arcuate throw for the float and rod.

The rod 61 extends across the bracket 70 and the end thereof, which is opposite to that carrying float 60, is arranged for attachment to a switch actuating linkage, as will now be described. Particularly, with reference to Figures 2 and 4 of the drawings, it will be understood that rod 61 is slotted at its rearward end for the inserted mounting of a pivot tongue 82 comprising a plate element which is affixed to rod 61 in a substantially vertical plane by means of a pin member 83. A pivot bearing 84 is carried transversely adjacent the outer end of tongue 82 for receiving a pivot pin 85. A pivot yoke 86 is affixed rigidly to the lower end of a vertical linkage or actuating rod 87 and the pivot tongue and yoke are arranged to cooperate in forming a pivotal connection; the tongue 82 fitting between the spaced arms of yoke 86 and the pivot pin 85 connecting such two members.

From the elemental portions of the float assembly 13 described thus far, it will be appreciated that vertical throw of the float 60, according to arrow A in Figure 2, causes corresponding rectilinear motion of the rod member 87, which incidently extends vertically upward through chamber 36 of the linkage housing 11; the connection of rod 87 to rod 61 being located in the lower chamber 34 of the linkage housing. The rod 87 also extends through the two flange portions 38 and 40 of housing 11 and into the interior of dome member 45. There it connects, as by a rivet 88, to the lower end of a cylindrical plug 89. The plug 89 is covered with a tubular cap element 90 for housing a permanent rod magnet 91. The cap and magnet assembly are arranged for coaxial rectilinear movement within the dome plug 45 so that the polar ends of magnet 91 reciprocate with the activity of rod 87. Such reciprocal actuation of the magnet 91 serves to in turn initiate activity of the switch assembly 14, all according to the principles and concepts as outlined and described in particular detail in my prior filed copending application, Serial No. 267,891, filed January 23, 1952, and entitled Level Controlled Switch Mechanism which issued as Patent No. 2,671,834 on March 9, 1954. Briefly, it will be sufficient for present purposes to point out that the switch assembly 14 is preferably magnetically actuated by the vertical throw of the primary magnet 91; the same switch assembly carrying one or more permanent magnets, such as 94 illustrated in Figure 1 of the drawings. Means are provided for pivotal activity of magnet 94 which carries a contact arm 95 arranged to move between pairs of electrical contact elements 96, 96. In such a manner I provide a necessary switch function controllable in response to liquid level changes with the chamber 20 of the float assembly housing.

Operation

Briefly, in operation a device of the character described hereinabove is arranged for attachment to a boiler or a like device such that either the same is located within the boiler or exteriorly thereof but in communication with the pressures and liquids of the boiler to create a responsive atmosphere within the chamber 20 to which the liquid level control means may react. Normally a device of this type is placed in conjunction with the boiler feed water system so that activity of the float assembly will regulate the feed of the water to the boiler. In certain instances the float chamber housing 10 may be eliminated and the device mounted by connecting flange 30 directly to the boiler wall, etc., so that the float 60 will respond to the liquid levels within the boiler.

Of particular importance in this present invention is the provision of my new and improved pivotal mounting means whereby the float assembly is supported on a flexible fulcrum located intermediate the ends of the float rod. Such a resilient fulcrum comprising the pair of resilient leaf springs demonstrates particular merit in this type of device due to the fact that the same provides an extremely sensitive pivotal support while eliminating the ordinary concepts of a bearing and pivot rod. This means that the danger of a frozen pivot support for the float system is completely eliminated, assuring continued and accurate operation of the device.

A second feature which is of paramount importance in the present device, lies in the provision of the air dome or conical shaped vertical portion of the linkage housing 11 and the air cooling fins 39 and 46 related thereto. In operating a device of this character, at pressures, for example, in the neighborhood of 250 p. s. i., the internal temperature within housing 11 reaches the neighborhood of 400° F. It will be understood immediately that the switch assembly 14 which is indirectly in contact with the housing 11 is consequently subject to extremely high temperatures. With the employment of normal materials, wiring, etc., these high operating temperatures lead to a very short life for the switch means unless special precautions are taken to avoid this trouble. Such precautions to date have included the employment of special insulation materials for the switch means which elevate its operating thermal limits somewhat, but nevertheless do not give complete assurance of long life at high operating temperatures. By providing a plurality of air cooling fins particularly about the somewhat conical shaped air chamber 36 of housing 11 and dome plug 45, I have been able to decrease the aforesaid ambient temperatures for the switch from a dangerously high level to a completely safe operating zone of approximately 100° F. within the switch housing per se. While I appreciate that the employment of air cooling fins is notoriously old, there is an added feature in this device which is of greater importance concerning the cooling effects gained. Such feature resides in the provision of the vertical conical chamber 36 of the linkage housing 11. In this regard it will be noted that the housing 11 contains the internal web 35a which forms a trap wall for the liquid in housing 11 such that I can successfully trap a body of air above the liquid within chamber 36 which extends up to the dome plug at the upper end of the linkage housing. This air is maintained under a compressed state by the operating pressures experienced within the chamber 20. Since air is a relatively poor transmitter of heat or that is has a good insulating value, transmission of temperatures from the liquid within the control device to the switch is maintained at a minimum and restricted by-in-large to the thermal carrying capacity and transmitting qualities of the casting for housing 11 and dome plug 45. Since the cast walls of this housing and plug are provided with the plurality of air cooling fins, such rapidly dispel the heat carried by their walls to account for the drastic drop in temperatures between chamber 34 and the switch housing. The merit and worth of this feature of my invention will be appreciated particularly by those familiar with the problems of this type of boiler control device and such is thought to mark my housing structure as an improved advancement in this art.

From the above description and the illustration of my device found in the accompanying drawings, it is believed that the functions and features of the air dome housing structure and my improved pivotal mounting means are clear. It will also be appreciated that while I have herein discussed the virtues of my invention as related to a single and preferred embodiment thereof, numerous changes, modifications and substitutions of equivalents may be resorted to therein without necessarily departing from the spirit and scope of my invention. As a consequence it is not my intention that I be limited to the particular form of my invention herein illustrated and described except as may appear in the following appended claims.

I claim:

1. In a liquid level responsive boiler control device of the class described, a float chamber housing having liquid inlet and outlet means, a substantially elbow shaped linkage housing connected to one side of said float housing and enclosing a substantially horizontal chamber communicating at one end with the interior of said float chamber housing and at the other end with a substantially vertical chamber, skirt wall means depending partially into said horizontal chamber and serving to trap air in said vertical chamber when liquid is introduced to said device, switch means mounted exteriorly of the upper end of said vertical chamber, float means in said float chamber, linkage means connecting said switch means to said float means, leaf spring means supporting said linkage means in a manner permitting arcuate movement of said float to operate said switch means, and air cooling fin means formed about the wall portions of said linkage housing which enclose and define said vertical chamber, whereby said switch means is effectively insulated from the operating temperatures existing within said float chamber by the air entrapped in said vertical chamber and said wall portions of such linkage housing are effectively cooled by said fin means.

2. A liquid level responsive boiler control device of the class described, comprising in combination, a float chamber housing having liquid inlet and outlet means, a substantially elbow shaped linkage housing connected to and extending outwardly of one side of said float housing, said linkage housing having two right angularly related substantially conical shaped chambers, one of which is remote from the float housing and the other of which communicates with the interior of said float housing, a dome member having sealed connection with and extending outwardly of one end of said one conical chamber, magnetically responsive switch means mounted outwardly of said one chamber and adjacent said dome member, a permanent magnet moveable rectilinearly within said dome, rod means moveable with said permanent magnet and extending into said one conical chamber, a float rod pivotally joined at one end to said rod means, a float supported on the other end of said float rod and within said float chamber housing, and a flexible leaf spring mounting means supporting said float rod intermediate its ends for pivotal movement, said spring means providing a resilient fulcrum for the movements of said float rod and rigidifying the same against the displacement laterally of its path of normal arcuate motion.

3. In a liquid level responsive boiler control device of the class described, a float, switch means remote from said float, linkage means comprising two substantially right angularly related and pivotally joined rod members relating said float operatively with said switch means whereby the latter is actuated in response to arcuate movements of said float, a leaf spring means pivotally supporting one rod of said linkage means intermediate its ends, and a housing means enclosing said float and linkage means, said housing forming a float chamber having means for the introduction and exit of liquid to its interior whereby said float is moveable in response to changes in liquid level therewithin, and a vertical chamber remote from said float chamber and which is located intermediate said float chamber and said switch, said vertical chamber being of a design to entrap a body of air for purposes of insulating said switch means from the operating temperatures existing within said float chamber.

4. In a liquid level responsive control device for boilers operating under pressure, a float rod, float means mounted at one end of said float rod, fixed support means intermediate the ends of said float rod and resilient spring means fixedly connected at one end to said float rod and at its other end to said support means to retain said float rod against substantial axial movement relative to said support means under the influence of pressure in the boiler, said spring means being located intermediate the ends of said float rod and providing a resilient substantially fixed pivotal fulcrum therefor.

5. In a liquid level responsive boiler control device of the class described, a rigid float rod, float means carried at one end of said float rod, stationary supporting bracket means adjacent said rod, spring means connected at one end to an intermediate portion of said float rod, and said spring means being connected at the other end to said stationary support bracket means to provide a resilient substantial fixed pivotal fulcrum for said float rod intermediate the ends, thereby affording movement of the other end of said float rod upon movement of said float means.

6. For use in a liquid level responsive control device for pressure boilers, the combination comprising, a float, a rod attached at one end to said float, a collar member secured to said rod intermediate its ends, a mounting bracket arranged adjacent said collar for attachment to a support, and a pair of resilient leaf springs interconnecting said collar means and bracket preventing substantial axial movement of said rod relative to said bracket under influence of pressure in said boiler, said two springs being arranged in coplanar parallelism on opposite sides of said rod preventing substantial lateral movement thereof and such that the latter is arcuately moveable in a single plane according to the flexing action of said springs acting as a fulcrum.

7. In a boiler control of the class described the combination comprising, a hollow float chamber housing having inlet and outlet means for the passage of liquid therethrough, a substantially elbow shaped linkage housing, forming two interconnected conical chambers, mounted on said float chamber housing with the conical chambers thereof being in communication with the hollow interior of said float housing, the axis of said two conical shape chambers being related substantially at right angles and the device being normally positioned such that one of said conical chambers resides in a substantially vertical position, a depending skirt wall formed inwardly of the upper wall of said other conical chamber and intermediate said float chamber and said one conical chamber whereby when liquid is introduced to said float chamber a body of air is entrapped within said one vertical chamber, a dome member sealing over the upper end of said vertical conical chamber, a magnetically responsive switch means mounted exteriorly of the upper end of said vertical chamber and adjacent said dome member, a permanent magnet moveable rectilinearly within said dome member, linkage means interconnecting said permanent magnet with said float whereby said magnet is rectilinearly responsive to arcuate actuation of said float as caused by changes of liquid levels within said float chamber, and a plurality of air cooling fins formed about the exterior walls of said vertical conical chamber and said dome member whereby said switch means is effectively insulated by said entrapped body of air from the operating temperatures existing within said float chamber and said walls of said vertical chamber and dome member are effectively air cooled by said fin means.

References Cited in the file of this patent

UNITED STATES PATENTS

| | | |
|---|---|---|
| 1,338,987 | Kettering | May 4, 1920 |
| 1,952,897 | Spencer | Mar. 27, 1934 |
| 1,985,659 | Hickstein et al. | Dec. 25, 1934 |
| 2,244,131 | Van Norstrand | June 3, 1941 |
| 2,580,759 | Gille | Jan. 1, 1952 |
| 2,583,952 | Kmiecik | Jan. 29, 1952 |
| 2,646,067 | Smith | July 21, 1953 |